Feb. 6, 1940.   K. E. JONES   2,189,038
REAMER
Filed Dec. 16, 1938

Inventor
K. E. JONES

Patented Feb. 6, 1940

2,189,038

UNITED STATES PATENT OFFICE 2,189,038

REAMER

Kenneth E. Jones, Houston, Tex., assignor to Reed Roller Bit Company, Houston, Tex., a corporation of Texas Application December 16, 1938, Serial No. 246,182

3 Claims. (Cl. 255—73)

This invention relates to reamers and has particular reference to a reamer of the roller type mounted in a portion of a drill stem.

The general object of this invention is to provide a reamer construction of the type set forth in which the reamer cutter may be readily and firmly mounted in the reamer body.

Various means have been provided for mounting reamer cutters in side recesses in the reamer body in which they are carried. Numerous such attempts have resulted in structures which though they served as mountings for the cutters were nevertheless not susceptible of easy removal of the cutters for replacement and repair. Other types of mountings have proved to be unsatisfactory in that they do not form adequate support for the cutters and the cutters are either displaced by the stresses encountered during drilling or tend to become loosened and in some instances entirely lost.

It is, therefore, an object of this invention to provide a rigid substantial support for reamer cutters, which support will properly support the cutter against movement under operating conditions and yet will be susceptible of ready removal in the event it is desired to repair or replace any particular cutter.

Other objects and advantages of this invention will become apparent from the following description taken in connection with the accompanying drawing wherein one embodiment is set forth by way of illustration. It is to be understood that the embodiment set forth in said drawing and description is for illustration only and is not to be taken by way of limitation.

Figures 1, 2, 3, 4, 5, 6:
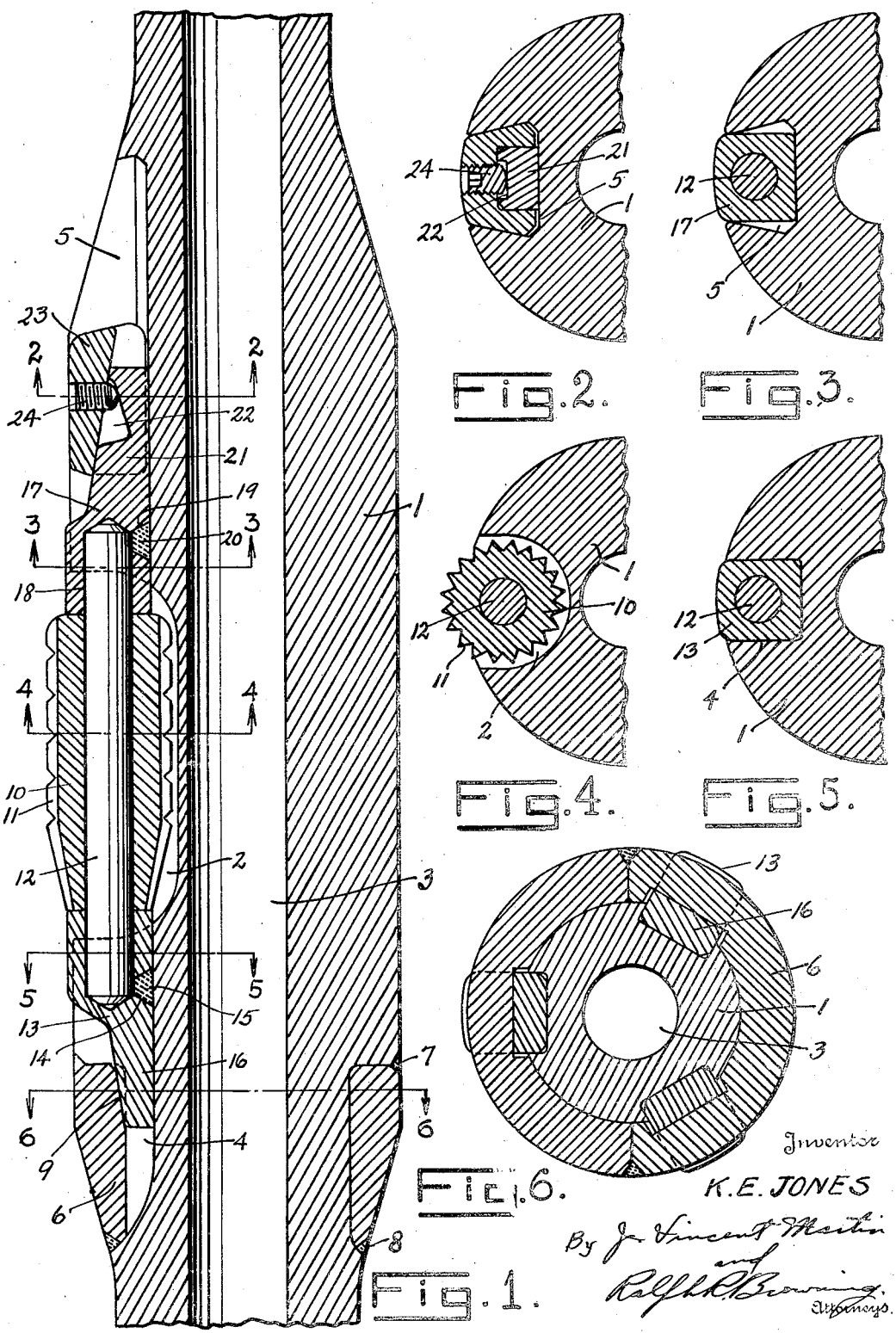
Fig. 1 is a vertical cross sectional view through a reamer body illustrating a reamer cutter mounted therein in accordance with this invention.
Fig. 2 is a horizontal cross section taken along the line 2—2 of Fig. 1.
Fig. 3 is a horizontal cross section taken along the line 3—3 of Fig. 1.
Fig. 4 is a horizontal cross section taken along the line 4—4 of Fig. 1.
Fig. 5 is a horizontal cross section taken along the line 5—5 of Fig. 1.
Fig. 6 is a horizontal cross section taken along the line 6—6 of Fig. 1.

In the illustration shown in the drawing the numeral 1 indicates the body of the reamer, this body being formed with a plurality of major cutter recesses 2 at spaced points about its outer surface and with a longitudinal passageway 3 therethrough. At each end of each of the major recesses 2 is formed a minor recess, the lower of these being designated by the numeral 4 and the upper by the numeral 5. The ring 6 lies in an annular recess and overlies an end portion of each of the recesses 4, this ring being formed in two parts and extending entirely about the body 1 and being welded in place thereon as shown at 7 and 8. They are also welded together at their ends as shown at 7' and 8' in Fig. 6. The recesses 4 are of uniform width throughout and their bottom surfaces are substantially parallel to the axis of the reamer body. The inner surface of the ring 6 where it overlies the recesses 4 is provided with a slight taper for a portion of its width as illustrated at 9. The upper recess is of dovetail shape as illustrated in Figs. 2 and 3, being wider along its bottom than along the outer surface of the reamer body.

The reamer cutters 10 are formed in the usual manner with cutter teeth 11 extending longitudinally thereof, or extending in any other direction which may be desired, and each of these cutters is rotatably mounted upon a pin 12.

Upon the roller end of the pin 12 is mounted a block 13 having an opening to receive the end of the pin 12, this opening being intersected by a smaller opening 14 into which welding metal is inserted as shown at 15 after the cutter pin is in place. This serves to weld the cutter pin within the recess in the block 13. This block 13 has a part 16 extending away from the end of the pin 12 and adapted to lie against the bottom of the recess 4. This part 16 is tapered on its outer surface to a degree corresponding to the taper 9 on the inside surface of the ring 6. Thus, when the block 13 is forced longitudinally until the part 16 passes beneath the ring 9, it will be firmly wedged in place so as to be held rigidly within the body 1. In this connection it may be mentioned that the portion 16 of the block 13 is of the same width as the recess 4 and forms a snug though not tight fit with that recess.

The upper end of the pin 12 is likewise inserted in an upper block 17, having an opening 18 to receive the pin and an opening 19 intersecting the opening 18 for the purpose of receiving weld material 20 to secure the pin 12 in place in the same manner that the pin 12 is secured within the block 13. The block 17, however, is of substantially the same width as the outer portion of the recess 5. At its inner portion, the block 17 is narrower than the recess 5, as illustrated in Fig. 3. The block 17 extends beyond the end of the pin 12 and away from the pin as shown at 21, this portion 21 being tapered in a manner similar to the portion 16 of the block 13. However, unlike the portion 15 of the block 13 it is of much reduced width so that it is not nearly as wide as the recess 5. Within the outer surface of the tapered portion 21, there is formed a small groove or recess 22, the bottom of which is inclined downwardly and inwardly toward the axis of the reamer body for a purpose to be presently set forth.

For the purpose of holding the block 17 in position within the recess 5, there is provided a locking block 23 having an outer cross sectional shape adapted to snugly fit within the recess 5. Because of this cross sectional shape and the fact that the recess 5 is itself of dovetail shape, as above mentioned, the block 23 can not be moved laterally outwardly from this recess but can only be slid along the recess in a longitudinal direction. This block 23 is provided with a groove in its inner surface of a size adapted to receive the tapered portion 21 of the block 17. The bottom of this groove is likewise tapered to a degree to cooperate with the taper on the block 17 and the block 23 is provided with a set screw 24 adapted when screwed inwardly to engage the recess 22 in the block 17 and secure the block 23 in position.

In assembling the reamer and body just described the body 1 is first formed in the manner set forth and the ring 6 welded in place. The cutter 10 is then placed on the pin 12 and the blocks 13 and 17 welded onto the ends of these pins as illustrated. The block 23 is then slipped into place within the recess 5 from the lower end thereof and is moved to a point adjacent the upper end of this recess. Next the tapered portion 16 of the block 13 is inserted into the recess 4 beneath the ring 6 and is driven home by one or more hammer blows against the block 17.

The block 23 is then slid along the recess 5 until it overlies the tapered portion 21 of the block 17, and the block 23 is then driven tightly onto the tapered portion 21 by means of blows of a hammer or other convenient means. After this has been done, the set screw 24 is tightened and the threads in the block 23 at the outer end of the set screw are peened to prevent the set screw from backing out.

It will be seen that the block 13 is rigidly held by virtue of the fact that it is tightly wedged beneath the ring 6 which is in turn welded about the body 1. The block 13 is also prevented from any lateral movement by virtue of the fact that it fits snugly within the recess 4.

The upper end of the reamer pin 12 will likewise be firmly held by the block 17, this block being prevented from lateral movement by virtue of its fit with the outer portion of the recess 5 and by virtue of the fit of its tapered end within the groove within the block 23. It will be prevented from outward movement in a radial direction and from longitudinal movement in an upward direction by virtue of the wedging effect of the block 23 within the recess 5 and of the tapered portion 21 within the groove in the block 23 respectively It is also to be noted that the block 23 cannot back off from its wedging engagement with the block 17 because of the fact that the set screw 24 will prevent such movement. It has been noted that the inner surface of the recess 22, within which the set screw fits, is inclined downwardly and inwardly toward the axis of the reamer body. This means that any tendency of this block 23 to slide backward toward released position would be opposed by the set screw because in such sliding movement the set screw would become more firmly wedged against the inclined bottom of the recess 22.

If and when it is desired to remove the reamer cutter from the reamer body 1, it is only necessary to strike the block 23 with a hammer in a direction to drive it off of the tapered section 21. It will be necessary to drive this block with sufficient force to shear off the set screw 24 whereupon the block 23 will slide upwardly in the recess 5 releasing the block 17, after which the block 13 may be struck with a hammer to drive it from under the ring 6.

From the foregoing, it will be apparent that a means has been provided for mounting a reamer cutter within a recess in a reamer body in a manner which will hold the cutter rigidly and prevent it from being moved or dislodged from its position during drilling operation. It will further be apparent that the means devised will be found to be durable and because of the relatively small number of parts involved, it will be found to be inexpensive to manufacture and substantially trouble free.

On the other hand, it will be apparent upon occasions when it is desired, the reamer cutter may be readily removed for replacement or repair without damaging the reamer body or any other part of the device, with the exception of the set screw, to such an extent that it cannot be used again.

Having described my invention, I claim:

1. In a reamer, a reamer body having a major recess in the outer surface thereof and a minor recess opening into each end of said major recess, respectively one of said recesses being of rectangular cross-section and the other of said recesses being of dovetail cross-section, a part overlying a portion of said one recess to form a tapered pocket opening toward said major recess, a roller cutter adapted to be mounted in said major recess, a shaft on which said cutter is rotatably mounted, a block secured to each of the opposite ends of said shaft, one of said blocks having a tapered extension adapted to fit within said pocket and the other of said blocks having a tapered extension adapted to rest in said dovetail recess but of reduced width so that it is not as wide as said dovetail recess and wedgingly receive a block of a cross sectional shape adapted to wedgingly fit within said dovetail recess, and means engaging said last named block and said last named tapered extension to urge the last named block into wedging engagement with said last named tapered extension.

2. In a reamer, a reamer body having a major recess in the outer surface thereof and a minor recess opening into each end of said major recess, respectively, one of said recesses being of rectangular cross-section and the other of said recesses being of dovetail cross-section, a part overlying a portion of said one recess to form a tapered pocket opening toward said major recess, a roller cutter adapted to be mounted in said major recess, a shaft on which said cutter is rotatably mounted, a block secured to each of the opposite ends of said shaft, one of said blocks having a tapered extension adapted to fit within said pocket and the other of said blocks having a tapered extension adapted to rest in said dovetail recess but of reduced width so that it is not as wide as said dovetail recess and wedgingly receive a block of a cross sectional shape adapted to wedgingly fit within said dovetail recess, and a set screw on said last named block and engaging said last named tapered extension to urge the last named block into wedging engagement with said last named tapered extension.

3. In a reamer, a reamer body having a major recess in the outer surface thereof and a minor recess opening into each end of said major recess, respectively, one of said recesses being of rectangular cross-section and the other of said recesses being of dovetail cross-section and providing a longitudinal outwardly tapered slideway, a part overlying a portion of said one recess to form a tapered pocket opening toward said major recess, a roller cutter adapted to be mounted in said major recess, a shaft on which said cutter is rotatably mounted, a block secured to each of the opposite ends of said shaft, one of said blocks having a tapered extension adapted to fit within said pocket and the other of said blocks having a tapered extension adapted to rest in said dovetail recess but of reduced width so that it is not as wide as said dovetail recess and wedgingly receive a block of a cross-sectional shape adapted to wedgingly fit within said dovetail recess, and a set screw on said last named block and engaging said last named tapered extension to urge the last named block into wedging engagement with said last named tapered extension.

KENNETH E. JONES.